(12) United States Patent
Xu

(10) Patent No.: US 11,064,012 B2
(45) Date of Patent: Jul. 13, 2021

(54) FILE DOWNLOADING METHOD, APPARATUS, AND NON-TRANSITORY COMPUTER-READABLE STORAGE MEDIUM

(71) Applicant: Beijing Bytedance Network Technology Co., Ltd., Beijing (CN)

(72) Inventor: Pengzhan Xu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/705,144

(22) Filed: Dec. 5, 2019

(65) Prior Publication Data

US 2020/0186588 A1 Jun. 11, 2020

(30) Foreign Application Priority Data

Dec. 6, 2018 (CN) .......................... 201811485128.6

(51) Int. Cl.
G06F 15/16 (2006.01)
H04L 29/08 (2006.01)
G06F 16/174 (2019.01)

(52) U.S. Cl.
CPC .......... *H04L 67/06* (2013.01); *G06F 16/1752* (2019.01); *H04L 67/104* (2013.01); *H04L 67/1038* (2013.01)

(58) Field of Classification Search
CPC ... H04L 67/06; H04L 67/1038; H04L 67/104; G06F 16/1752
See application file for complete search history.

(56) References Cited

U.S. PATENT DOCUMENTS

| | | | |
|---|---|---|---|
| 2006/0179155 A1* | 8/2006 | Bunting | .................. H04L 67/06 709/232 |
| 2017/0201566 A1 | 7/2017 | Zhang | |
| 2018/0034894 A1* | 2/2018 | Jin | .......................... H04L 67/02 |

FOREIGN PATENT DOCUMENTS

| | | | |
|---|---|---|---|
| CA | 2463126 A1 | 5/2003 | |
| CN | 103227812 A | 7/2013 | |
| CN | 105007322 A | 10/2015 | |

(Continued)

OTHER PUBLICATIONS

"Chunk-Simple, fast file splitter"; Dec. 21, 2015, The Oldskool PC, 4 pages (Year: 2015).*

*Primary Examiner* — Richard G Keehn
(74) *Attorney, Agent, or Firm* — BakerHostetler

(57) ABSTRACT

Disclosed are a file downloading method, apparatus, and electronic device. A preferred embodiment of the method comprises: determining, in response to receiving a download instruction issued from a user with respect to a target file, whether a download task for downloading the target file is present in a download task list; obtaining the size of the target file from the server in response to determining that the download task with respect to the target file is not in the download task list; determining a current network speed of a download network in use; splitting the target file into chunks based on the current network speed and the size of the target file to obtain at least one to-be-downloaded chunk file and chunk information corresponding to respective to-be-downloaded chunk files; and performing download operations simultaneously on the respective to-be-downloaded chunk files.

15 Claims, 5 Drawing Sheets

(56) References Cited

FOREIGN PATENT DOCUMENTS

| | | |
|---|---|---|
| CN | 106961454 A | 7/2017 |
| CN | 107959700 A | 4/2018 |
| JP | H11-242640 A | 9/1999 |
| JP | 2015-125657 A | 7/2015 |
| JP | 2018-514863 A | 6/2018 |
| KR | 10-2017-0132289 | 12/2017 |
| WO | WO 2017/126105 A1 | 7/2017 |

* cited by examiner

FILE DOWNLOADING METHOD, APPARATUS, AND NON-TRANSITORY COMPUTER-READABLE STORAGE MEDIUM

CROSS-REFERENCE TO RELATED APPLICATIONS

This application claims priority to Chinese Patent Application No. 201811485128.6, filed with the China National Intellectual Property Administration (CNIPA) on 6, Dec. 2018, the content of which is incorporated herein by reference in its entirety.

TECHNICAL FIELD

Embodiments of the present disclosure generally relate to the field of Internet technology.

BACKGROUND

A related technology of downloading a file via a client is over a single connection. However, the single connection has a limited download speed in certain circumstances. Therefore, a file is always split into chunks to be downloaded over multiple connections so as to break through download speed limitations of a single connection in the current network environment.

To implement download in chunks, a related technology is to split data corresponding to a target file into a plurality of segments according to a fixed proportion, then download the data of the plurality of segments separately over multiple connections, and then splice the data of the plurality of segments upon completion of all downloads. However, as the network speed is not consistent during a file downloading process, the approach of downloading a target file with fixed chunks throughout the download time likely prolongs the download time, which affects user experience.

SUMMARY

Embodiments of the present disclosure provide a file downloading method, a file downloading apparatus, and an electronic device.

In a first aspect, embodiments of the present disclosure provide a file downloading method, comprising: determining, in response to receiving a download instruction issued from a user with respect to a target file, whether a download task for downloading the target file is present in a download task list; obtaining a size of the target file in response to determining that the download task with respect to the target file is not in the download task list; determining a current network speed of a download network in use; splitting the target file into chunks based on the current network speed and the size of the target file to obtain at least one to-be-downloaded chunk file; and performing download operations simultaneously on a plurality of to-be-downloaded chunk files.

Optionally, the performing download operations simultaneously on a plurality of to-be-downloaded chunk files comprises: creating chunk download threads respectively corresponding to the plurality of to-be-downloaded chunk files, such that a plurality of chunk download threads simultaneously perform download operations on downloading their respective corresponding to-be-downloaded chunk files.

Optionally, the splitting the target file into chunks based on the current network speed and the size of the target file to obtain at least one to-be-downloaded chunk file comprises: determining a first number of chunks of the target file based on a preset chunk splitting strategy; adjusting the first number of chunks based on the current network speed according to a preset chunk adjustment strategy to obtain a second number of chunks; and splitting the target file into chunks based on the second number of chunks to obtain at least one to-be-downloaded chunk file.

Optionally, the obtaining a size of the target file in response to determining that the download task with respect to the target file is not in the download task list comprises: initiating a connection request for obtaining the size of the target file to a server; receiving information indicating the size of the target file transmitted from and fed back by the server based on the connection request, and determining the size of the target file based on the information.

Optionally, the creating chunk download threads respectively corresponding to the plurality of to-be-downloaded chunk files, such that a plurality of chunk download threads simultaneously perform download operations on downloading their respective corresponding to-be-downloaded chunk files, comprises: multiplexing, by the chunk download thread corresponding to a first to-be-downloaded chunk file, a connection used by the connection request.

Optionally, the method further comprises: in response to at least one chunk download thread having completed a download task of downloading a corresponding to-be-downloaded chunk file, determining whether a thread exists in which an unfinished portion of the corresponding to-be-downloaded task is greater than a preset task threshold; in response to determining that the threshold exists in which an unfinished portion of the corresponding to-be-downloaded task is greater than a preset task threshold, determining the thread as a target download thread, and determining at least one chunk subtask corresponding to the unfinished portion; and downloading the at least one chunk subtask using the target download thread and the chunk download thread having completed downloading of the corresponding to-be-downloaded chunk file.

Optionally, the method further comprises: in response to determining that the download task with respect to the target file is present in the download task list, obtaining download state information of at least one to-be-downloaded chunk file which is locally cached and obtained from pre-splitting the target file; for each to-be-downloaded chunk file, continuing downloading data corresponding to the to-be-downloaded chunk file based on a download offset value corresponding to the download state information of the to-be-downloaded chunk file; wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

Optionally, the determining a current network speed of a download network in use comprises: determining a current network speed moving average based on a network speed sample value sequence acquired at a plurality of sampling time points within a current network speed sampling period, and determining the network speed moving average as the current network speed.

In a second aspect, embodiments of the present disclosure provide an apparatus for file downloading, comprising: at least one processor; and a memory storing instructions, the instructions when executed by the at least one processor, cause the at least one processor to perform operations, the operations comprising: determining, in response to receiving a download instruction issued from a user with respect to a target file, whether a download task for downloading the target file is present in a download task list; obtaining a size of the target file in response to determining that the download task with respect to the target file is not in the download task list; determining a current network speed of a download network in use; splitting the target file into chunks based on the current network speed and the size of the target file to obtain at least one to-be-downloaded chunk file; and performing download operations simultaneously on a plurality of to-be-downloaded chunk files.

Optionally, the performing download operations simultaneously on a plurality of to-be-downloaded chunk files comprises: creating chunk download threads respectively corresponding to the plurality of to-be-downloaded chunk files, such that a plurality of chunk download threads simultaneously perform download operations on downloading their respective corresponding to-be-downloaded chunk files.

Optionally, the splitting the target file into chunks based on the current network speed and the size of the target file to obtain at least one to-be-downloaded chunk file comprises: determining a first number of chunks of the target file based on a preset chunk splitting strategy; adjusting the first number of chunks based on the current network speed according to a preset chunk adjustment strategy to obtain a second number of chunks; and splitting the target file into chunks based on the second number of chunks to obtain at least one to-be-downloaded chunk file.

Optionally, the obtaining a size of the target file in response to determining that the download task with respect to the target file is not in the download task list comprises: initiating a connection request for obtaining the size of the target file to a server; and receiving information indicating the size of the target file transmitted from and fed back by the server based on the connection request, and determining the size of the target file based on the information.

Optionally, the creating chunk download threads respectively corresponding to the plurality of to-be-downloaded chunk files, such that a plurality of chunk download threads simultaneously perform download operations on downloading their respective corresponding to-be-downloaded chunk files, comprises: multiplexing, by the chunk download thread corresponding to a first to-be-downloaded chunk file, a connection used by the connection request.

Optionally, the operations further comprise: in response to at least one chunk download thread having completed a download task of downloading a corresponding to-be-downloaded chunk file, determining whether a thread exists in which an unfinished portion of the corresponding to-be-downloaded task is greater than a preset task threshold; in response to determining that the threshold exists in which an unfinished portion of the corresponding to-be-downloaded task is greater than a preset task threshold, determining the thread as a target download thread, and determining at least one chunk subtask corresponding to the unfinished portion; and downloading the at least one chunk subtask using the target download thread and the chunk download thread having completed downloading of the corresponding to-be-downloaded chunk file.

Optionally, the operations further comprise: in response to determining that the download task with respect to the target file is present in the download task list, obtaining download state information of at least one to-be-downloaded chunk file which is locally cached and obtained from pre-splitting the target file; and for each to-be-downloaded chunk file, continuing downloading data corresponding to the to-be-downloaded chunk file based on a download offset value corresponding to the download state information of the to-be-downloaded chunk file; wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

In a third aspect, embodiments of the present disclosure provide a non-transitory computer-readable storage medium storing a computer program, the computer program when executed by one or more processors, causes the one or more processors to perform operations, the operations comprising: determining, in response to receiving a download instruction issued from a user with respect to a target file, whether a download task for downloading the target file is present in a download task list; obtaining a size of the target file in response to determining that the download task with respect to the target file is not in the download task list; determining a current network speed of a download network in use; splitting the target file into chunks based on the current network speed and the size of the target file to obtain at least one to-be-downloaded chunk file; and performing download operations simultaneously on a plurality of to-be-downloaded chunk files.

BRIEF DESCRIPTION OF THE DRAWINGS

The drawings are provided to facilitate understanding the present disclosure, rather than constituting an improper limitation to the present disclosure, wherein.

DETAILED DESCRIPTION

Hereinafter, illustrative embodiments of the present disclosure will be explained in conjunction with the drawings, which include various details of the embodiments of the present disclosure to facilitate understanding. They should be deemed as only illustrative. Therefore, those of normal skill in the art should appreciate that various alternations and modifications may be made to the embodiments described herein without departing from the scope and spirit of the present disclosure.

It is noted that without conflicts, the embodiments in the present disclosure may be combined with each other, so may the features in the embodiments.

Figure 1:
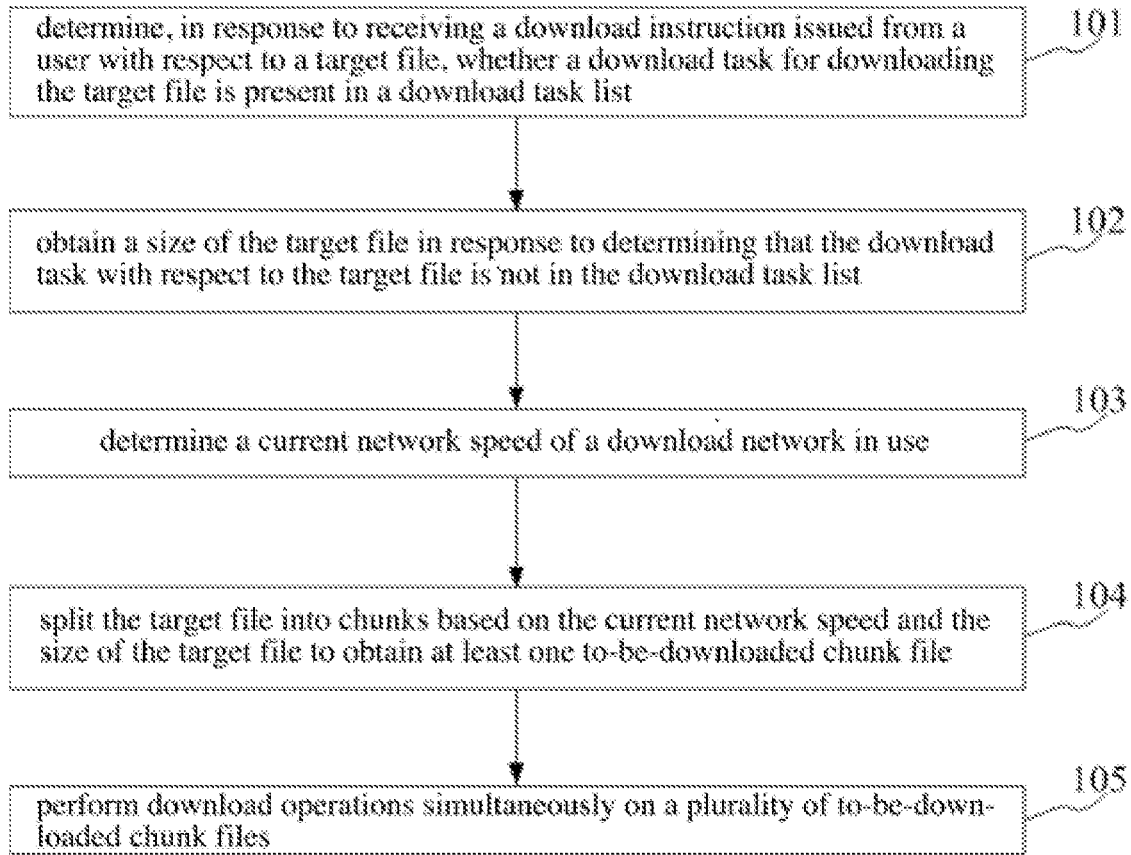
FIG. 1 shows a flow diagram of an embodiment of a file downloading method according to the present disclosure.

Please refer to FIG. 1, in which a flow of an embodiment of a file downloading method according to the present disclosure is presented. As shown in FIG. 1, the file downloading method comprises steps of:

Step 101: determining, in response to receiving a download instruction issued from a user with respect to a target file, whether a download task for downloading the target file is present in a download task list.

In this embodiment, the user may issue a download instruction with respect to the target file to a terminal device. The target file may be pushed by the terminal device to the user or obtained by the user through active searching.

In this embodiment, the terminal device may be arranged with a preset download application.

In some application scenarios, the target file may be obtained by the user through searching via the preset download application.

In some other application scenarios, the target file may be pushed to the user by a server via a web page or a page of a preset application based on the user profile of the user.

The user may issue an instruction of downloading the target file to the terminal device by performing a select operation on the target file and selecting a download option.

In response to receiving the download instruction issued by the user with respect to the target file, if the preset download application is in a non-running state at this point, run the preset download application.

Further, it may be determined whether a download task of downloading the target file is already present in the download task list, i.e., determining whether the download task of downloading the target file is an unfinished download task in the download task list of the preset download application.

The download task list may be set in the preset download application. The download task list may include a list of unfinished tasks. Whether an identifier of the target file is included in the list of unfinished tasks may be checked based on the identifier of the target file. If the identifier of the target file is included, it indicates that the target file is an unfinished download task in the download task list of the preset download application. Otherwise, the target file is not an unfinished task in the download task list.

Step 102: obtaining a size of the target file in response to determining that the download task with respect to the target file is not in the download task list.

In this embodiment, a request for obtaining a size of the target file may be transmitted to the server via a preset communication interface so as to obtain the size of the target file. The size of the target file for example may refer to the number of bytes included in the target file.

In some embodiments, the obtaining a size of the target file in response to determining that the download task with respect to the target file is not in the download task list may comprise: initiating a connection request for obtaining the size of the target file to a server; receiving information indicating the size of the target file transmitted from and fed back by the server based on the connection request, and determining the size of the target file based on the information.

Generally, when each download task starts, a download thread is assigned to the download task. This download thread first performs various checks (e.g., state validity check, cache integrity check, whether the network is available, whether the disk space is enough, whether broken download resuming is supported, etc.), and after these checks, the download thread transmits a header range field of a first http request to the server. This http request is for obtaining a range of to-be-downloaded bytes of the file. When the target file is a new download task, the range field may have a value of 0. If the target file is an unfinished download task, the value of the range field is a start offset value (StartOffset) of the requested data calculated based on cached data. For example, if 400 bytes have been downloaded in aggregation before the unfinished download task, the start offset value may be 400. In other words, the connection request will request the server to return all bytes following the $400^{th}$ byte counted from the $1^{st}$ byte of the target file.

After receiving the request for obtaining the size of the target file, the server may look up the total number of bytes included in the target file in relevant information of the target file as locally stored, wherein the total number of bytes included in the target file is fed back to the terminal device as the size of the target file.

Specifically, the request for obtaining the size of the target file may further include identifiers of terminal devices. The identifiers of terminal devices may be used for distinguishing different terminal devices in the network. The identifiers of terminal devices for example may include numbers, symbols, or a combination of numbers and symbols. In the network, the identifier of each terminal device is unique.

When receiving the request for obtaining the size of the target file from the terminal device, the server may feed back the size of the target file to the terminal device based on the identifier of the terminal device in the request.

A header of the response data returned from the server has a content-length field, which may tell the size of the non-downloaded portion of the target file. When downloading the target file is a new download task, what is transmitted from and fed back by the server is the size of the target file, i.e., the number of bytes included in the target file.

Step 103: determining a current network speed of a download network in use.

The current network speed of the download network currently in may be determined according to various conventional network speed determining methods. For example, an operation of pe-downloading the target file from the server is performed. Then, the current network speed of the download network in use is determined based on the number of real-time uploaded bytes and the number of downloaded bytes.

In some embodiments, the determining a current network speed of a download network in use comprises: determining a current network speed moving average based on a network speed sample value sequence acquired at a plurality of sampling time points within a current network speed sampling period, and determining the network speed moving average as the current network speed.

In practice, the network moving average, which is calculated based on the network sample value sequence acquired by sampling network speeds at a plurality of sampling time points within the current network sampling period, serves as the current network speed of the download network.

In these embodiments, the current network speed of the download network is determined based on the network moving average. The network speed obtained as such is close to an actual value of the network speed, causing the subsequent splitting of the target file into chunks more reasonable.

Step 104: splitting the target file into chunks based on the current network speed and the size of the target file to obtain at least one to-be-downloaded chunk file.

In this embodiment, the target file may be split into chunks based on the current network speed and the size of the target file obtained in step 103, such that at least one to-be-downloaded chunk file may be obtained. The step 104 may further comprise the following steps:

First, a first number of chunks of the target file may be determined based on a preset chunk splitting strategy. The preset chunk splitting strategy for example may be determining the number of chunks of the target file based on the size of the target file. Specifically, if the size of the target file is greater than a first preset threshold, the number of chunks corresponding to the target file may be N1; if the size of the target file is smaller than a second preset threshold, the number of chunks corresponding to the target file may be N2; if the size of the target file is greater than the second preset threshold but smaller than the first preset threshold, the number of chunks corresponding to the target file may be N3, wherein N2<N3<N1, and N1, N2, and N3 are all positive integers greater than or equal to 1.

Second, the number of first chunks is adjusted based on the current network speed according to a preset chunk adjustment strategy to obtain a second number of chunks.

Specifically, the preset chunk adjustment strategy may include increasing the number of chunks of the target file based on the first number of chunks if the current network speed is greater than a first preset network speed threshold, obtaining the second number of chunks with a value greater than the first number of chunks. If the current network speed is greater than a second present network speed threshold but lower than the first preset network speed threshold, the original number of the first chunks may be maintained, obtaining a second number of chunks with a value equal to the first number of chunks; if the current network speed is lower than the second preset network speed threshold, the number of chunks of the target file is reduced based on the first number of chunks, obtaining a second number of chunks with a value lower than the first number of chunks.

The first preset network speed threshold may be any network speed greater than 1 byte per second. The second preset network speed threshold may be any network speed greater than 1 byte per second. Moreover, the first preset network speed threshold is greater than the second network speed threshold. A specific value of the gap between the first preset network speed threshold and the second network speed threshold is set based on application scenarios, which is not limited here.

Further, the target file is split into chunks based on the second number of chunks to obtain at least one to-be-downloaded chunk file.

Chunk information corresponding to respective to-be-downloaded chunk files is generated while the target file is split. The chunk information of each to-be-downloaded chunk file may include: identifier information, index, initial byte offset amount, last byte offset amount, and byte length of the to-be-downloaded chunk file.

In some application scenarios, the target file may be split into chunks of equal size based on the number of chunks to split. Hereinafter, the illustration will be made with an example that the target file includes 1000 bytes and the target file is split into 4 to-be-downloaded chunk files. The 1000-byte target file may be evenly split into 4 to-be-downloaded chunk files, wherein each to-be-downloaded chunk file may include 250 bytes. For example, the each to-be-downloaded chunk file may include the $1^{st}$ to $250^{th}$ bytes of the target file; the second to-be-downloaded chunk file may include the $251^{st}$ to $500^{th}$ bytes of the target file; the third to-be-downloaded chunk file may include the $501^{st}$ to $750^{th}$ bytes of the target file; and the fourth to-be-downloaded chunk file may include the $751^{st}$ to $1000^{th}$ bytes of the target file.

The start offset value corresponding to the initial byte of the first to-be-downloaded chunk file is 0, and the end offset value corresponding to the last byte thereof is 249. The start offset value corresponding to the initial byte of the second to-be-downloaded chunk file is 250, and the end offset value corresponding to the last byte thereof is 499. The start offset value corresponding to the initial byte of the third to-be-downloaded chunk file is 550, and the end offset value corresponding to the last byte thereof is 749. The start offset value corresponding to the initial byte of the fourth to-be-downloaded chunk file is 750, and the end offset value corresponding to the last byte thereof is 999. The corresponding byte lengths of the first to-be-downloaded chunk file, the second to-be-downloaded chunk file, the third to-be-downloaded chunk file, and the fourth to-be-downloaded chunk file are 250 bytes, respectively.

Step 105: performing download operations simultaneously on a plurality of to-be-downloaded chunk files.

After splitting the target file to obtain at least one to-be-downloaded chunk file in step 104, download operations may be performed simultaneously on respective to-be-downloaded chunk files based on chunk information corresponding to the respective to-be-downloaded chunk files.

The file downloading method provided in the embodiments of the present disclosure implement splitting of a target file into chunks according to a chunk splitting method matching the current network speed of the download network and enable simultaneous download of respective to-be-downloaded chunk files resulting from the chunk splitting by adopting the steps of: first determining, in response to receiving a download instruction issued from a user with respect to a target file, whether a download task for downloading the target file is present in a download task list; then obtaining a size of the target file in response to determining that the download task with respect to the target file is not in the download task list; next determining a current network speed of a download network in use; then splitting the target file into chunks based on the current network speed and the size of the target file to obtain at least one to-be-downloaded chunk file; and finally, performing download operations simultaneously on a plurality of to-be-downloaded chunk files. On one hand, the present disclosure boosts the download speed of the target file, and on the other hand, the present disclosure may improve user experience.

In some embodiments, the file downloading method may further comprise: in response to determining that the download task with respect to the target file is present in the download task list, obtaining download state information of at least one to-be-downloaded chunk file which is locally cached and obtained from pre-splitting the target file; for each to-be-downloaded chunk file, continuing downloading data corresponding to the to-be-downloaded chunk file based on a download offset value corresponding to the download state information of the to-be-downloaded chunk file; wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

In these embodiments, if network interruption occurs during the target file downloading process, or the download is interrupted due to the user's download pause operation, downloaded portions of the respective to-be-downloaded chunk files may be saved in a memory zone for storing the target file. Download state information corresponding to the respective to-be-downloaded chunk files are cached in Cash Memory, saved in Memory and saved in a database of the terminal device.

The at least one to-be-downloaded chunk file obtained by pre-splitting the target file refers to at least one to-be-downloaded chunk file obtained by splitting the target file based on the network speed before performing a download operation on the target file.

The download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

For each to-be-downloaded chunk file of the target file, when the network is resumed or the user selects to continue downloading the target file, downloading of the data corresponding to the to-be-downloaded chunk file continues based on the download offset amount corresponding to the download state information of the to-be-downloaded chunk file. In other words, a download request for continuing downloading of the to-be-downloaded chunk file may be initiated to the server with the byte whose serial number immediately follows the offset amount as the initial byte for the present download.

In these embodiments, when resuming the download after interruption, download of respective to-be-downloaded chunk files may be resumed from the broken points, which may overcome the issue of restarting download from the initial byte of the target file after interruption of the last download.

Figure 2:
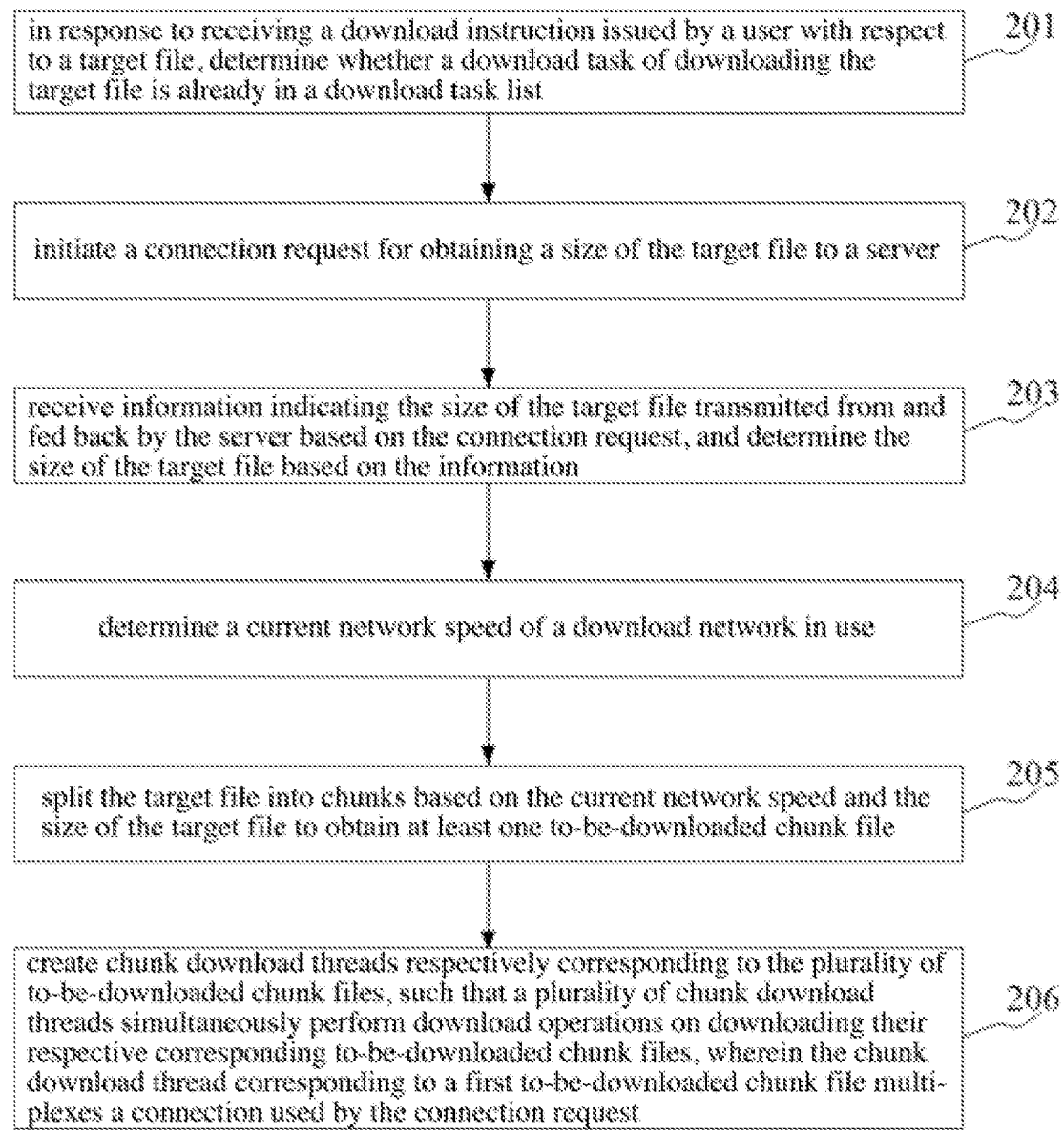
FIG. 2 shows a flow diagram of another embodiment of a file downloading method according to the present disclosure.

Further refer to FIG. 2, which shows a flow diagram of another embodiment of the file downloading method. As shown in FIG. 2, the flow of the file downloading method comprises steps of:

Step 201: in response to receiving a download instruction issued by a user with respect to a target file, determining whether a download task of downloading the target file is already in a download task list.

The step 201 is identical to the step 101 in the embodiment of FIG. 1, which is thus not detailed here.

Step 202: initiating a connection request for obtaining a size of the target file to a server.

Detailed explanation of the step 202 may refer to relevant description about the step 102 in the embodiment of FIG. 1, which is thus not detailed here.

Step 203: receiving information indicating the size of the target file transmitted from and fed back by the server based on the connection request, and determining the size of the target file based on the information.

Detailed explanation of the step 203 may refer to relevant description about step 102 in the embodiment of FIG. 1, which is thus not detailed here.

Step 204: determining a current network speed of a download network in use.

The step 204 is identical to the step 103 shown in FIG. 1, which is thus not detailed here.

Step 205: splitting the target file into chunks based on the current network speed and the size of the target file to obtain at least one to-be-downloaded chunk file.

The step 205 is identical to the step 104 shown in FIG. 1, which is thus not detailed here.

Step 206: creating chunk download threads respectively corresponding to the plurality of to-be-downloaded chunk files, such that a plurality of chunk download threads simultaneously perform download operations on downloading their respective corresponding to-be-downloaded chunk files, wherein the chunk download thread corresponding to a first to-be-downloaded chunk file multiplexes a connection used by the connection request.

In some application scenarios, chunk download threads respectively corresponding to a plurality of to-be-downloaded chunk files may be created such that a plurality of chunk download threads simultaneously perform download operations on downloading their respective corresponding to-be-downloaded chunk files.

Each chunk download thread may transmit an http request to the server to download the to-be-downloaded chunk file corresponding to the chunk download thread. The download request may use a start offset value of an initial byte of the to-be-downloaded chunk file as the first download byte, while an end offset value of the last byte of the to-be-downloaded chunk file as the last download byte. In this way, download requests may be initiated to the server simultaneously based on chunk information of respective to-be-downloaded chunk files so as to perform download operations.

In this embodiment, a connection used by the connection request in step 202 may be multiplexed as the download request connection transmitted by the chunk download thread corresponding to the first to-be-downloaded chunk file to the server, i.e., the chunk download thread corresponding to the first to-be-downloaded chunk file multiplexes the connection used by the connection request.

It may be seen from FIG. 2 that compared with the embodiment of FIG. 1, the flow 200 of the file downloading method in this embodiment highlights creating chunk download threads respectively corresponding to a plurality of to-be-downloaded chunk files such that a plurality of chunk download threads simultaneously perform download operations on downloading their respective corresponding to-be-downloaded chunk files, wherein the chunk download thread corresponding to the first to-be-downloaded chunk file multiplexes the connection used by the connection request, thereby implementing http connection multiplexing, which may shorten the time taken for connecting between the download threads and the server and thus may shorten the overall time taken for downloading the target file.

In some embodiments, the file downloading method shown in FIG. 2 may further comprise steps of:

First, in response to at least one chunk download thread having completed a download task of downloading a corresponding to-be-downloaded chunk file, determining whether a thread exists in which an unfinished portion of the corresponding to-be-downloaded task is greater than a preset task threshold.

Second, in response to determining that the threshold exists in which an unfinished portion of the corresponding to-be-downloaded task is greater than a preset task threshold, determining the thread as a target download thread, and determining at least one chunk subtask corresponding to the unfinished portion.

Specifically, when there is a chunk download thread which is the first one to finish the download task of downloading the corresponding to-be-downloaded chunk file, the unfinished portion corresponding to the target download thread may be split into chunks according to a preset chunk splitting rule to obtain at least two chunk subtasks. In some application scenarios, the number of chunk subtasks may be equal to the number of to-be-downloaded chunk files split from the target file.

For a chunk download thread which is not the first one to finish the download task of downloading the corresponding to-be-downloaded chunk file, it may be determined that when the chunk download thread has finished the download task, the chunk subtasks are not assigned download thread corresponding to the target download thread Third, downloading the chunk subtask using the target download thread and the chunk download thread which has finished downloading of the corresponding to-be-downloaded chunk file.

Specifically, the first chunk subtask is still continuously downloaded by the target download thread. Other chunk subtasks may be executed by the chunk download threads having finished downloading of the corresponding to-be-downloaded chunk files. For example, the second chunk subtask is assigned to the chunk download thread which first finishes the download task of downloading the corresponding to-be-downloaded chunk file, and the third chunk subtask is assigned to the chunk download thread which is the second one finishing the download task of downloading the corresponding to-be-downloaded chunk file, and so on.

In these embodiments, when downloading the respective to-be-downloaded chunk files of the target file in multiple download threads, there likely occurs a phenomenon that some to-be-downloaded chunk files are completely downloaded in advance, while some other to-be-downloaded chunk files lag behind.

To address this phenomenon, if there are still other download threads which haven't completed their respective download tasks after one or more download threads have completed their download tasks, the unfinished download tasks may be performed jointly using the download threads which have completed their respective download tasks and other download threads which have not completed their download tasks yet, thereby implementing multiplexing of the chunk download threads, which may reduce the frequency of the processor to perform task scheduling, thread creating, and thread switching, thereby further boosting the download speed and shortening the overall download time of the target file.

Figure 3:
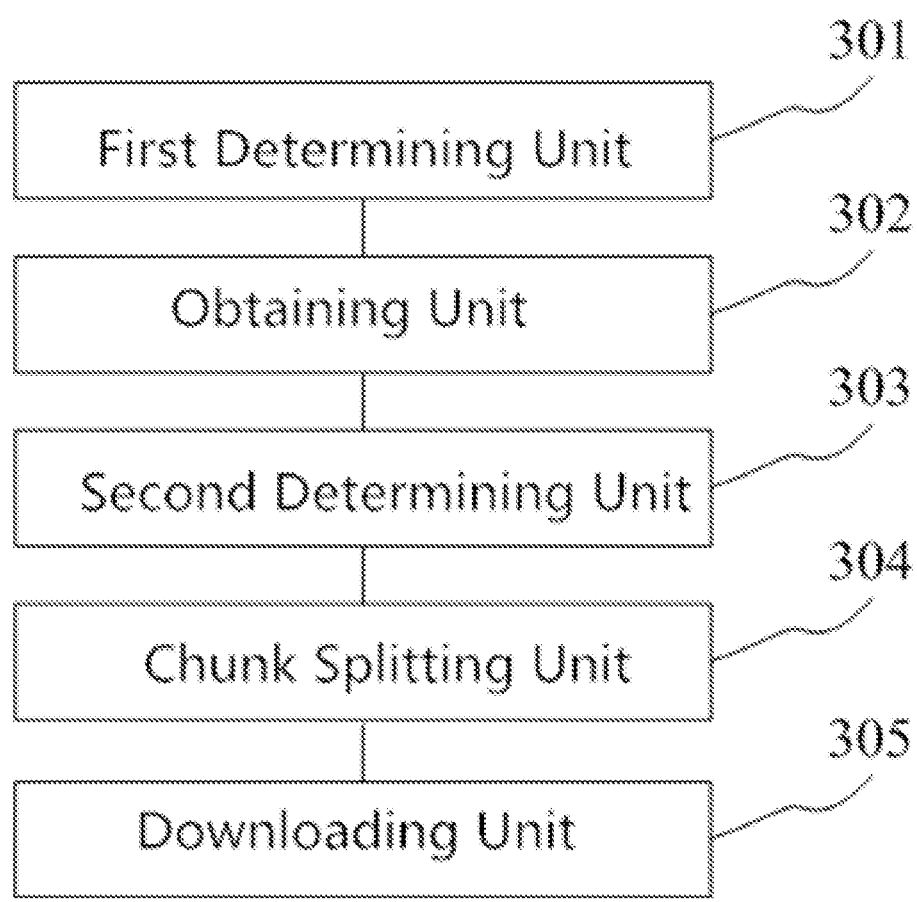
FIG. 3 shows a structural schematic diagram of an embodiment of a file downloading apparatus according to the present disclosure.

Further referring to FIG. 3, as an implementation of the method shown in the figures above, the present disclosure provides an embodiment of a file downloading apparatus. This apparatus embodiment corresponds to the method embodiment shown in FIG. 1. The apparatus may be specifically applied to various electronic devices.

As shown in FIG. 3, the file downloading apparatus according to this embodiment may comprise a first determining unit 301, an obtaining unit 302, a second determining unit 303, a chunk splitting unit 304, and a downloading unit 305. Particularly, the first determining unit 301 is configured for determining, in response to receiving a download instruction issued from a user with respect to a target file, whether a download task for downloading the target file is present in a download task list; the obtaining unit 302 is configured for obtaining a size of the target file in response to determining that the download task with respect to the target file is not in the download task list; the second determining unit 303 is configured for determining a current network speed of a download network in use; a chunk splitting unit 304 is configured for splitting the target file into chunks based on the current network speed and the size of the target file to obtain at least one to-be-downloaded chunk file; and a downloading unit 305 is configured for performing download operations simultaneously on a plurality of to-be-downloaded chunk files.

In this embodiment, the first determining unit 301, the obtaining unit 302, the second determining unit 303, the chunk splitting unit 304, and the downloading unit 305 of the file downloading apparatus may refer to relevant explanations of the step 101, the step 102, the step 103, the step 104, and the step 105 in the embodiment corresponding to FIG. 1, which are thus not detailed here.

In some implementation manners, the downloading unit 305 is further configured for: creating chunk download threads respectively corresponding to the plurality of to-be-downloaded chunk files, such that a plurality of chunk download threads simultaneously perform download operations on downloading their respective corresponding to-be-downloaded chunk files.

In some implementation manners, the chunk splitting unit 304 is further configured for: determining a first number of chunks of the target file based on a preset chunk splitting strategy; adjusting the first number of chunks based on the current network speed according to a preset chunk adjustment strategy to obtain a second number of chunks; and splitting the target file into chunks based on the second number of chunks to obtain at least one to-be-downloaded chunk file.

In some implementation manners, the obtaining unit 302 is further configured for: initiating a connection request for obtaining the size of the target file to a server; receiving information indicating the size of the target file transmitted from and fed back by the server based on the connection request, and determining the size of the target file based on the information.

In some implementation manners, the downloading unit 305 is further configured for: multiplexing, by the chunk download thread corresponding to a first to-be-downloaded chunk file, a connection used by the connection request.

In some implementation manners, the downloading unit is further configured for: in response to at least one chunk download thread having completed a download task of downloading a corresponding to-be-downloaded chunk file, determining whether a thread exists in which an unfinished portion of the corresponding to-be-downloaded task is greater than a preset task threshold; in response to determining that the threshold exists in which an unfinished portion of the corresponding to-be-downloaded task is greater than a preset task threshold, determining the thread as a target download thread, and determining at least one chunk subtask corresponding to the unfinished portion; and downloading the at least one chunk subtask using the target download thread and the chunk download thread having completed downloading of the corresponding to-be-downloaded chunk file.

In some implementation manners, the apparatus 300 further comprises a broken download resuming unit (not shown). The broken download resuming unit is configured for: in response to determining that the download task with respect to the target file is present in the download task list, obtaining download state information of at least one to-bedownloaded chunk file which is locally cached and obtained from pre-splitting the target file; for each to-be-downloaded chunk file, continuing downloading data corresponding to the to-be-downloaded chunk file based on a download offset value corresponding to the download state information of the to-be-downloaded chunk file; wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

In some implementation manners, the second determining unit 303 is further configured for: determining a current network speed moving average based on a network speed sample value sequence acquired at a plurality of sampling time points within a current network speed sampling period, and determining the network speed moving average as the current network speed.

Figure 4:
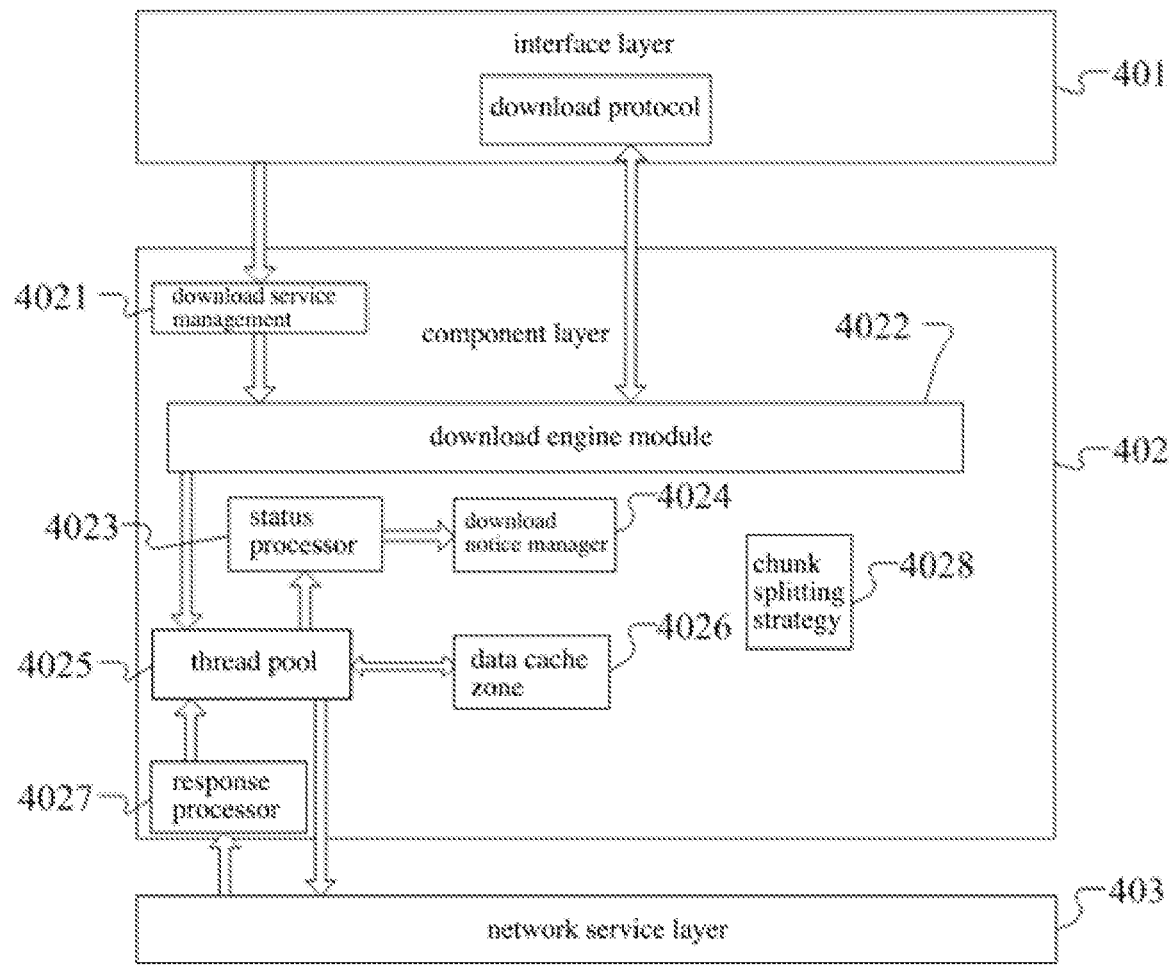
FIG. 4 shows a specific structural schematic diagram of the file downloading apparatus according to the present disclosure.

Please refer to FIG. 4 which is a specific structural schematic diagram of the file downloading apparatus according to the present disclosure.

As shown in FIG. 4, the file downloading apparatus comprises an interface layer 401, a component layer 402, and a network service layer 403.

The interface layer 401 provided user interfaces for extension initializer, pause, cancel, restart, obtaining a download state, and data. Interface segregation and extension are implemented via a download protocol 4011. Besides, an interface is reserved for multithread download.

A component layer 402 comprises a download service management module 4021, a download engine module 4022, a state processor 4023, a download notice manager 4024, a thread pool 4025, a data cache zone 4026, a response processor 4027, and a chunk splitting strategy module 4028. Particularly, the download service management module 4021 may receive instructions such as download, download pause, download cancel, download start, and download restart inputted by the user via the interface layer, and manage download tasks according to the instructions. The download management module 4021 may transmit a plurality of download tasks to the download engine module 4022. The download engine module 4022 is responsible for distributing download tasks and scheduling the status processor 4023, the download notice manager 4024, the thread pool 4025, the data cache zone 4026, the response processor 4027, and the chunk splitting strategy module 4028 to cooperate in implementing the download tasks. The thread pool 4025 is responsible for managing all download threads. The status processor 4023 is responsible for handling all download states and distributing them. The data caching module 4026 is responsible for caching and resuming data of the download tasks in respective states. The download notice manager 4024 is responsible for download notices such that the user needs not manage transmission and update of the download notices. The response processor is responsible for network response and chunk data processing. The chunk strategy module 4028 provides an approach for downloading chunks.

The network layer 403 provides an extendable network layer interface and provides a default okhttps3 implementation, for supporting a network request for download.

The connection request is transmitted to the server via the network service layer 403 based on a connection thread assigned by the thread pool so as to obtain the size of the target file corresponding to the download task from the server. The chunk splitting strategy module 4028 splits the target file based on the current network speed of the current network to obtain at least one to-be-downloaded chunk file.

Figure 5:
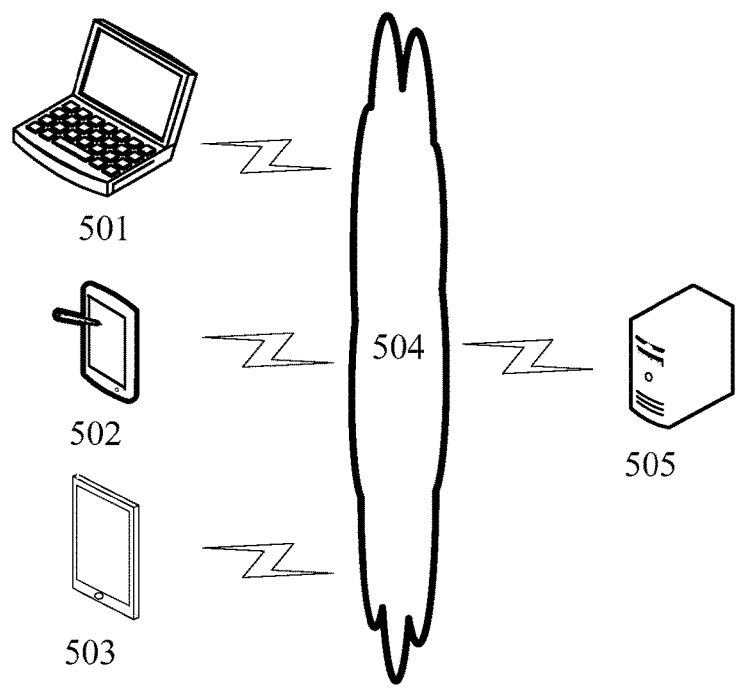
FIG. 5 is an exemplary system architecture diagram in which embodiments of the present disclosure may apply.

Please refer to FIG. 5, which shows an exemplary system architecture in which the embodiments of the file downloading method or file downloading apparatus of the present disclosure may be applied.

As shown in FIG. 5, the system architecture may comprise a terminal device 501, 502, 503, a network 504, and a server 505. The network 504 may serve as a medium for providing a communication link between the terminal device 501, 502, 503 and the server 505. The network 504 may have various connection types, e.g., wired and wireless communication links or optical fiber cable, etc.

The terminal device 501, 502, 503 may interact with the server 505 via the network 504 to receive or transmit messages. The terminal device 501, 502, 503 may be installed with various kinds of client applications (e.g., download applications, search applications, etc.).

The terminal device 501, 502, 503 may be hardware or software. When the terminal device 501, 502, 503 is hardware, it may be various kinds of electronic devices having a display screen and supporting file download, including, but not limited to, a smart phone, a tablet computer, a laptop, a desk computer, and an electronic book reader, etc. When the terminal device 501, 502, 503 is software, they may be installed in the electronic devices listed above. They may also be implemented as a plurality of pieces of software or software modules (e.g., software or software modules for providing distributed services).

The terminal device 501, 502, 503 may receive a target file download instruction inputted by the user to obtain a size of the target file from the server 505 and download the target file in chunks.

The server 505 may provide various kinds of services, for example, providing a source file of the target file for the terminal device to download.

It needs to be noted that the file downloading method provided by the embodiments of the present disclosure are generally executed by the terminal device 501, 502, 503. Correspondingly, the file downloading apparatus is generally arranged in the terminal device 501, 502, 503.

It should be understood that the numbers of the terminal devices, network and server are only schematic. Dependent on implementation needs, there may be any numbers of terminal devices, network and server.

Hereinafter, FIG. 6 will be referenced, which shows a schematic diagram of a basic structure of an apparatus adapted for implementing the embodiments of the present disclosure. The apparatus illustrated in FIG. 6 is only exemplary, constituting no limitation to the functions and use of scope of the embodiments of the present disclosure.

Figure 6:
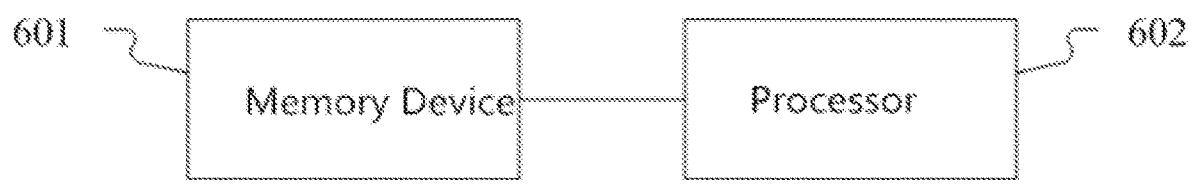
FIG. 6 is a schematic diagram of a basic structure of an apparatus provided according to the embodiments of the present disclosure.

As shown in FIG. 6, the apparatus may comprise one or more processors 602, and a memory device 601. The memory device 601 is configured for storing one or more programs. The one or more programs in the memory device 601 may be executed by the one or more processors 602. When the one or more programs are executed by the one or more processors, the one or more processors are enabled to perform operations, the operations comprising: determining, in response to receiving a download instruction issued from a user with respect to a target file, whether a download task for downloading the target file is present in a download task list; obtaining a size of the target file in response to determining that the download task with respect to the target file is not in the download task list; determining a current network speed of a download network in use; splitting the target file into chunks based on the current network speed and the size of the target file to obtain at least one to-be-downloaded chunk file; and performing download operations simultaneously on a plurality of to-be-downloaded chunk files.

In some implementation manners, the performing download operations simultaneously on a plurality of to-be-downloaded chunk files comprises: creating chunk download threads respectively corresponding to the plurality of to-be-downloaded chunk files, such that a plurality of chunk download threads simultaneously perform download operations on downloading their respective corresponding to-be-downloaded chunk files.

In some implementation manners, the splitting the target file into chunks based on the current network speed and the size of the target file to obtain at least one to-be-downloaded chunk file comprises: determining a first number of chunks of the target file based on a preset chunk splitting strategy; adjusting the first number of chunks based on the current network speed according to a preset chunk adjustment strategy to obtain a second number of chunks; and splitting the target file into chunks based on the second number of chunks to obtain at least one to-be-downloaded chunk file.

In some implementation manners, the obtaining a size of the target file in response to determining that the download task with respect to the target file is not in the download task list comprises: initiating a connection request for obtaining the size of the target file to a server; and receiving information indicating the size of the target file transmitted from and fed back by the server based on the connection request, and determining the size of the target file based on the information.

In some implementation manners, the creating chunk download threads respectively corresponding to the plurality of to-be-downloaded chunk files, such that a plurality of chunk download threads simultaneously perform download operations on downloading their respective corresponding to-be-downloaded chunk files, comprises: multiplexing, by the chunk download thread corresponding to a first to-be-downloaded chunk file, a connection used by the connection request.

In some implementation manners, the operations further comprise: in response to at least one chunk download thread having completed a download task of downloading a corresponding to-be-downloaded chunk file, determining whether a thread exists in which an unfinished portion of the corresponding to-be-downloaded task is greater than a preset task threshold; in response to determining that the threshold exists in which an unfinished portion of the corresponding to-be-downloaded task is greater than a preset task threshold, determining the thread as a target download thread, and determining at least one chunk subtask corresponding to the unfinished portion; and downloading the at least one chunk subtask using the target download thread and the chunk download thread having completed downloading of the corresponding to-be-downloaded chunk file.

In some implementation manners, the operations further comprise: in response to determining that the download task with respect to the target file is present in the download task list, obtaining download state information of at least one to-be-downloaded chunk file which is locally cached and obtained from pre-splitting the target file; and for each to-be-downloaded chunk file, continuing downloading data corresponding to the to-be-downloaded chunk file based on a download offset value corresponding to the download state information of the to-be-downloaded chunk file; wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

The modules described in the embodiments of the present disclosure may be implemented by a software manner or a hardware manner. The described modules may also be arranged in a processor, for example, which may be described as: a processor comprises a first determining unit, an obtaining unit, a second determining unit, a chunk splitting unit, and a downloading unit, wherein the names of these modules do not constitute limitations to the modules per se in certain circumstances. For example, the first determining unit may be optionally described as "a unit configured for determining, in response to receiving a download instruction issued from a user with respect to a target file, whether a download task for downloading the target file is present in a download task list."

As another aspect, the present disclosure further provides a computer readable medium, the computer readable medium may be included in the apparatus described in the embodiments above, or may be present standalone without being installed in the apparatus. The computer readable medium of the present disclosure may be a computer readable signal medium or a computer readable memory medium or any combination of the two. The computer readable memory medium for example may be, but is not limited to, an electrical, magnetic, optical, electromagnetic, infrared, or semiconductor system, apparatus or device, or any combination thereof. More specific examples of the computer-readable memory medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

The computer-readable medium carries one or more programs. When the one or more programs are executed by the apparatus, the apparatus is caused to: determine, in response to receiving a download instruction issued from a user with respect to a target file, whether a download task for downloading the target file is present in a download task list; obtain a size of the target file in response to determining that the download task with respect to the target file is not in the download task list; determine a current network speed of a download network in use; split the target file into chunks based on the current network speed and the size of the target file to obtain at least one to-be-downloaded chunk file; and perform download operations simultaneously on a plurality of to-be-downloaded chunk files.

The preferred embodiments above do not constitute limitations to the protection scope of the present disclosure. Those skilled in the art should understand that dependent on design requirements and other factors, various modifications, combinations, sub-combinations, and substitutions may be made. Any modifications, equivalent substitutions and improvements made within the spirit and principle of the present disclosure should be included in the protection scope of the present disclosure.

What is claimed is:

1. A file downloading method, comprising:
   determining, in response to receiving a download instruction issued from a user with respect to a target file, whether a download task for downloading the target file is present in a download task list;
   obtaining a size of the target file in response to determining that the download task with respect to the target file is not in the download task list;
   determining a current network speed of a download network in use;
   splitting the target file into chunks based on the current network speed and the size of the target file to obtain at least one to-be-downloaded chunk file, wherein the splitting the target file into chunks based on the current network speed and the size of the target file to obtain at least one to-be-downloaded chunk file further comprises:
      determining a first number of chunks of the target file based on a preset chunk splitting strategy, wherein the preset chunk splitting strategy is associated with the size of the target file,
      adjusting the first number of chunks based on the current network speed according to a preset chunk adjustment strategy to obtain a second number of chunks, wherein the preset chunk adjustment strategy is associated with the current network speed, and
      splitting the target file into chunks based on the second number of chunks to obtain at least one to-be-downloaded chunk file; and
   performing download operations simultaneously on a plurality of to-be-downloaded chunk files, wherein the performing download operations simultaneously on a plurality of to-be-downloaded chunk files further comprises:
      creating a plurality of chunk download threads corresponding to the plurality of to-be-downloaded chunk files, and
      downloading the plurality of to-be-downloaded chunk files using the plurality of chuck download threads, respectively.

2. The method according to claim 1, wherein the obtaining a size of the target file in response to determining that the download task with respect to the target file is not in the download task list comprises:
   initiating a connection request for obtaining the size of the target file to a server; and
   receiving information indicating the size of the target file transmitted from and fed back by the server based on the connection request, and determining the size of the target file based on the information.

3. The method according to claim 2, wherein the creating chunk download threads respectively corresponding to the plurality of to-be-downloaded chunk files, such that a plurality of chunk download threads simultaneously perform download operations on downloading their respective corresponding to-be-downloaded chunk files, comprises:
   multiplexing, by the chunk download thread corresponding to a first to-be-downloaded chunk file, a connection used by the connection request.

4. The method according to claim 1, wherein the method further comprises:
   in response to at least one chunk download thread having completed a download task of downloading a corresponding to-be-downloaded chunk file, determining whether a thread exists in which an unfinished portion of the corresponding to-be-downloaded task is greater than a preset task threshold;
   in response to determining that the thread exists in which an unfinished portion of the corresponding to-be-downloaded task is greater than a preset task threshold, determining the thread as a target download thread, and determining at least one chunk subtask corresponding to the unfinished portion; and
   downloading the at least one chunk subtask using the target download thread and the chunk download thread having completed downloading of the corresponding to-be-downloaded chunk file.

5. The method according to claim 1, wherein the method further comprises:
   in response to determining that the download task with respect to the target file is present in the download task list, obtaining download state information of at least one to-be-downloaded chunk file which is locally cached and obtained from pre-splitting the target file;
   for each to-be-downloaded chunk file, continuing downloading data corresponding to the to-be-downloaded chunk file based on a download offset value corresponding to the download state information of the to-be-downloaded chunk file; wherein
   the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

6. An apparatus for file downloading, comprising:
   at least one processor; and
   a memory storing instructions, the instructions when executed by the at least one processor, cause the at least one processor to perform operations, the operations comprising:
   determining, in response to receiving a download instruction issued from a user with respect to a target file, whether a download task for downloading the target file is present in a download task list;
   obtaining a size of the target file in response to determining that the download task with respect to the target file is not in the download task list;
   determining a current network speed of a download network in use;
   splitting the target file into chunks based on the current network speed and the size of the target file to obtain at least one to-be-downloaded chunk file, wherein the splitting the target file into chunks based on the current network speed and the size of the target file to obtain at least one to-be-downloaded chunk file further comprises:
      determining a first number of chunks of the target file based on a preset chunk splitting strategy, wherein the preset chunk splitting strategy is associated with the size of the target file,
      adjusting the first number of chunks based on the current network speed according to a preset chunk adjustment strategy to obtain a second number of chunks, wherein the preset chunk adjustment strategy is associated with the current network speed, and
      splitting the target file into chunks based on the second number of chunks to obtain at least one to-be-downloaded chunk file; and performing download operations simultaneously on a plurality of to-be-downloaded chunk files, wherein the performing download operations simultaneously on a plurality of to-be-downloaded chunk files further comprises:
  creating a plurality of chunk download threads corresponding to the plurality of to-be-downloaded chunk files, and
  downloading the plurality of to-be-downloaded chunk files using the plurality of chuck download threads, respectively.

7. The apparatus according to claim 6, wherein the obtaining a size of the target file in response to determining that the download task with respect to the target file is not in the download task list comprises:
  initiating a connection request for obtaining the size of the target file to a server; and
  receiving information indicating the size of the target file transmitted from and fed back by the server based on the connection request, and determining the size of the target file based on the information.

8. The apparatus according to claim 7, wherein the creating chunk download threads respectively corresponding to the plurality of to-be-downloaded chunk files, such that a plurality of chunk download threads simultaneously perform download operations on downloading their respective corresponding to-be-downloaded chunk files, comprises:
  multiplexing, by the chunk download thread corresponding to a first to-be-downloaded chunk file, a connection used by the connection request.

9. The apparatus according to claim 6, wherein the operations further comprise:
  in response to at least one chunk download thread having completed a download task of downloading a corresponding to-be-downloaded chunk file, determining whether a thread exists in which an unfinished portion of the corresponding to-be-downloaded task is greater than a preset task threshold;
  in response to determining that the threshold exists in which an unfinished portion of the corresponding to-be-downloaded task is greater than a preset task threshold, determining the thread as a target download thread, and determining at least one chunk subtask corresponding to the unfinished portion; and
  downloading the at least one chunk subtask using the target download thread and the chunk download thread having completed downloading of the corresponding to-be-downloaded chunk file.

10. The apparatus according to a claim 6, wherein the operations further comprise:
  in response to determining that the download task with respect to the target file is present in the download task list, obtaining download state information of at least one to-be-downloaded chunk file which is locally cached and obtained from pre-splitting the target file; and
  for each to-be-downloaded chunk file, continuing downloading data corresponding to the to-be-downloaded chunk file based on a download offset value corresponding to the download state information of the to-be-downloaded chunk file; wherein
  the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

11. A non-transitory computer-readable storage medium storing a computer program, the computer program when executed by one or more processors, causes the one or more processors to perform operations, the operations comprising:
  determining, in response to receiving a download instruction issued from a user with respect to a target file, whether a download task for downloading the target file is present in a download task list;
  obtaining a size of the target file in response to determining that the download task with respect to the target file is not in the download task list;
  determining a current network speed of a download network in use;
  splitting the target file into chunks based on the current network speed and the size of the target file to obtain at least one to-be-downloaded chunk file, wherein the splitting the target file into chunks based on the current network speed and the size of the target file to obtain at least one to-be-downloaded chunk file further comprises:
    determining a first number of chunks of the target file based on a preset chunk splitting strategy, wherein the preset chunk splitting strategy is associated with the size of the target file,
    adjusting the first number of chunks based on the current network speed according to a preset chunk adjustment strategy to obtain a second number of chunks, wherein the preset chunk adjustment strategy is associated with the current network speed, and
    splitting the target file into chunks based on the second number of chunks to obtain at least one to-be-downloaded chunk file; and
  performing download operations simultaneously on a plurality of to-be-downloaded chunk files, wherein the performing download operations simultaneously on a plurality of to-be-downloaded chunk files further comprises:
    creating a plurality of chunk download threads corresponding to the plurality of to-be-downloaded chunk files, and
    downloading the plurality of to-be-downloaded chunk files using the plurality of chuck download threads, respectively.

12. The non-transitory computer-readable storage medium of claim 11, wherein the obtaining a size of the target file in response to determining that the download task with respect to the target file is not in the download task list comprises:
  initiating a connection request for obtaining the size of the target file to a server; and
  receiving information indicating the size of the target file transmitted from and fed back by the server based on the connection request, and determining the size of the target file based on the information.

13. The non-transitory computer-readable storage medium of claim 12, wherein the creating chunk download threads respectively corresponding to the plurality of to-be-downloaded chunk files, such that a plurality of chunk download threads simultaneously perform download operations on downloading their respective corresponding to-be-downloaded chunk files, comprises:

multiplexing, by the chunk download thread corresponding to a first to-be-downloaded chunk file, a connection used by the connection request.

14. The non-transitory computer-readable storage medium of claim 11, the operations further comprising:
- in response to at least one chunk download thread having completed a download task of downloading a corresponding to-be-downloaded chunk file, determining whether a thread exists in which an unfinished portion of the corresponding to-be-downloaded task is greater than a preset task threshold;
- in response to determining that the thread exists in which an unfinished portion of the corresponding to-be-downloaded task is greater than a preset task threshold, determining the thread as a target download thread, and determining at least one chunk subtask corresponding to the unfinished portion; and
- downloading the at least one chunk subtask using the target download thread and the chunk download thread having completed downloading of the corresponding to-be-downloaded chunk file.

15. The non-transitory computer-readable storage medium of claim 11, the operations further comprising:
- in response to determining that the download task with respect to the target file is present in the download task list, obtaining download state information of at least one to-be-downloaded chunk file which is locally cached and obtained from pre-splitting the target file;
- for each to-be-downloaded chunk file, continuing downloading data corresponding to the to-be-downloaded chunk file based on a download offset value corresponding to the download state information of the to-be-downloaded chunk file;
- wherein the download state information of each to-be-downloaded chunk file includes: a start offset value and an end offset value respectively corresponding to an initial byte and a last byte of the to-be-downloaded chunk file relative to an initial byte of the target file; and a byte length and a download offset value corresponding to the to-be-downloaded chunk file, wherein the download offset value is for indicating the number of downloaded bytes corresponding to the to-be-downloaded chunk file.

\* \* \* \* \*